United States Patent
Pott et al.

(10) Patent No.: US 7,356,988 B2
(45) Date of Patent: Apr. 15, 2008

(54) METHOD FOR CONTROLLING THE TEMPERATURE OF A CATALYST AND MULTICYLINDER ENGINE COMPRISING A LAMBDA SPLITTING EXHAUST GAS CLEANING SYSTEM

(75) Inventors: Ekkehard Pott, Gifhorn (DE); Kai Philipp, Lagesbuettel (DE); Eric Bree, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 183 days.

(21) Appl. No.: 10/541,004

(22) PCT Filed: Dec. 12, 2003

(86) PCT No.: PCT/EP03/14156

§ 371 (c)(1),
(2), (4) Date: Jun. 28, 2005

(87) PCT Pub. No.: WO2004/059150

PCT Pub. Date: Jul. 15, 2004

(65) Prior Publication Data

US 2006/0080951 A1    Apr. 20, 2006

(30) Foreign Application Priority Data

Dec. 30, 2002   (DE) ................................ 102 61 911

(51) Int. Cl.
*F01N 3/00*    (2006.01)
(52) U.S. Cl. ............................ 60/285; 60/274; 60/277; 60/286; 60/295; 60/297
(58) Field of Classification Search ............... 60/274, 60/277, 285, 286, 295, 297, 300, 301
See application file for complete search history.

(56) References Cited

U.S. PATENT DOCUMENTS

| 4,012,906 | A * | 3/1977 | Hattori et al. ............... 60/277 |
| 6,244,043 | B1 * | 6/2001 | Farmer et al. ............... 60/274 |
| 6,354,079 | B1 * | 3/2002 | Choi et al. .................. 60/286 |
| 6,634,170 | B2 * | 10/2003 | Hiranuma et al. ............ 60/295 |
| 6,651,422 | B1 * | 11/2003 | LeGare ........................ 60/274 |

(Continued)

FOREIGN PATENT DOCUMENTS

| DE | 43 10 145 A1 | 4/1994 |
| DE | 100 05 954 A1 | 8/2001 |
| DE | 100 31 874 A1 | 1/2002 |
| DE | 100 34 143 A1 | 2/2002 |
| DE | 100 57 938 A1 | 5/2002 |

(Continued)

*Primary Examiner*—Tu M. Nguyen
(74) *Attorney, Agent, or Firm*—Norris McLaughlin & Marcus PA

(57) ABSTRACT

The invention is directed to a method for controlling the temperature of at least one catalyst arranged in an exhaust gas cleaning system (12) of a lean-runnable multi-cylinder engine (10), wherein energy is introduced into the exhaust gas cleaning system (12) by a lambda split, and to a corresponding multicylinder engine (10). It is provided that the introduction of energy is limited depending on at least one of the parameters catalyst temperature, exhaust gas temperature and exhaust gas mass flow rate, and/or at least one of the parameters change of the catalyst temperature, change of the exhaust gas temperature and change of the exhaust gas mass flow rate, or at least one of the parameters rate of change of the catalyst temperature, rate of change of the exhaust gas temperature and rate of change of the exhaust gas mass flow rate.

28 Claims, 2 Drawing Sheets

| U.S. PATENT DOCUMENTS | | | | | FOREIGN PATENT DOCUMENTS | | |
|---|---|---|---|---|---|---|---|
| 6,763,659 | B2 * | 7/2004 | Watanabe et al. ............. 60/297 | DE | 101 43 234 | A1 | 6/2002 |
| 6,957,527 | B2 * | 10/2005 | Ueda et al. .................... 60/274 | DE | 101 12 938 | A1 | 10/2002 |
| 7,054,734 | B2 * | 5/2006 | Todoroki et al. ........... 701/105 | DE | 101 23 148 | A1 | 11/2002 |
| 7,152,392 | B2 * | 12/2006 | Kuboshima et al. .......... 60/277 | EP | 1 004 756 | B1 | 5/2000 |
| 7,169,364 | B2 * | 1/2007 | Ohtake et al. ............... 422/168 | EP | 1 205 803 | A1 | 5/2002 |
| 7,228,223 | B2 * | 6/2007 | Braun ........................ 701/114 | EP | 0 950 803 | B1 | 9/2003 |
| 7,249,454 | B2 * | 7/2007 | Ichise et al. ................... 60/285 | JP | 59150921 | A * | 8/1984 |
| 2002/0131276 | A1 | 9/2002 | Katoh et al. | | | | |
| 2005/0284131 | A1 * | 12/2005 | Forthmann et al. ........... 60/285 | * cited by examiner | | | | ical energy is advanta-
METHOD FOR CONTROLLING THE TEMPERATURE OF A CATALYST AND MULTICYLINDER ENGINE COMPRISING A LAMBDA SPLITTING EXHAUST GAS CLEANING SYSTEM

FIELD OF THE INVENTION

The invention is directed to a method for controlling the temperature of at least one catalyst arranged in an exhaust gas cleaning system of a lean-runnable multi-cylinder engine, wherein energy is introduced into the exhaust gas cleaning system by a lambda split, and to a corresponding multicylinder engine with a lambda-splittable exhaust gas cleaning system.

BACKGROUND OF THE INVENTION

Exhaust gases of internal combustion engines can typically be cleaned catalytically. The exhaust gas hereby passes over at least one catalyst, which converts one or several pollutant components of the exhaust gas. Different types of catalysts are known. Oxidation catalysts promote the oxidation of un-combusted carbohydrates (HC) and carbon monoxide (CO), whereas reduction catalysts support reduction of nitrogen oxides ($NO_x$) in the exhaust gas. The aforementioned components (HC, CO, $NO_x$) can also be simultaneously converted catalytically by using 3-way catalysts.

In addition, storage catalysts, such as $NO_x$ storage catalysts, are also known. These are used to clean exhaust gases of internal combustion engines which are operated at least temporarily in lean operating mode, i.e., with an oxygen-rich exhaust gas with $\lambda>1$, to optimize fuel consumption, producing large quantities of nitric oxides $NO_x$. $NO_x$ cannot be entirely converted by an oxidizing catalytic conversion of unburnt hydrocarbons HC and carbon monoxide CO to environmentally neutral nitrogen. This situation can be remedied by locating the aforementioned $NO_x$ storage catalysts in the exhaust channels of internal combustion engines, which during the lean operating phases store $NO_x$ as nitrate. The $NO_x$ storage catalyst must be regenerated from time to time by switching the internal combustion engine into a rich or sub-stoichiometric operating mode ($\lambda \leq 1$).

The aforementioned catalysts age when operating at high temperatures, which reduces the peak conversion rate compared to an undamaged catalyst. To reduce aging of the catalyst, the maximum allowable temperature in the exhaust gas system is monitored and is limited by adjusting operating parameters of the engine, preferably the lambda value of the combustion process.

On the other hand, it is necessary to heat the catalyst, i.e., to introduce energy into the exhaust gas system, so as to reach the optimal temperature window of the catalyst and to desulfurize the $NO_x$ catalysts, since these tend to be poisoned by sulfur contained in the fuel. Heating the catalyst removes the sulfur stored in the $NO_x$ catalysts. A minimum temperature of approximately 600° C. is required to desorb the sulfur which is stored in the form of sulfate.

Heating the catalysts poses problems in particular when using pre-catalysts and main catalysts, because the pre-catalysts may be thermally overloaded when the main catalyst is brought to the desired temperature.

Energy can be intentionally introduced into the exhaust gas cleaning system, preferably for desulfurizing $NO_x$ storage catalysts, by heating the catalyst, in particular a main catalyst, by simultaneously exposing the catalyst to lean and rich exhaust gas. For example, to achieve a desired lambda value of the exhaust gas before the main catalyst of 1.0, the exhaust gas is shifted in one of the two exhaust gas paths by a predetermined amount toward "rich", and likewise in the other path into the opposite direction. With this approach, the exhaust gas mix before the catalyst advantageously simultaneously contains high oxygen and pollutant concentrations. As a result, a large amount of chemically bound energy is converted in the catalyst. Because the energy required for heating the catalyst is converted to heat only in the catalyst, thermal losses on the path through the non-adiabatic exhaust gas system are eliminated. Moreover, any existing pre-catalysts are not thermally overloaded, which significantly extends their service life reliability.

This approach may introduce an increased risk of overloading the main catalyst, because at least a local thermal overload may not be preventable due to strong catalytic activity by a high conversion of chemical energy in the main catalyst. Moreover, a catalyst can be heated by a lambda split only, if the catalyst is at least partially active, i.e., is heated, because the catalyst must be thermally active for introducing the chemical energy.

SUMMARY OF THE INVENTION

It is therefore an object of the invention to provide a method for controlling the temperature of a catalyst arranged in an exhaust gas cleaning system of a lean-runnable multicylinder engine, wherein energy is introduced into the exhaust gas cleaning system by a lambda split, as well as a corresponding lean-runnable multicylinder engine with a lambda-splittable exhaust gas cleaning system, which reliably prevents the risk of thermally overloading the catalyst.

The object is solved by a method with the features recited in claim 1 and by a multicylinder engine with the features recited in claim 13.

According to the invention, a method is provided for controlling the temperature of a catalyst arranged in an exhaust gas cleaning system of a lean-runnable multi-cylinder engine, wherein energy can be introduced into the exhaust gas cleaning system by a lambda split, wherein a quantity of introduced energy is determined or limited depending on at least one of the parameters catalyst temperature, exhaust gas temperature and exhaust gas mass flow rate, and/or depending on at least one of the parameters change of the catalyst temperature, change of the exhaust gas temperature and change of the exhaust gas mass flow rate ($1^{st}$ derivative with respect to time), and/or depending on at least one of the parameters rate of change of the catalyst temperature, rate of change of the exhaust gas temperature and rate of change of the exhaust gas mass flow rate ($2^{nd}$ derivative with respect to time).

Advantageously, the lambda-splittable exhaust gas cleaning system is designed to have at least two passageways or exhaust gas paths between the multi-cylinder engine and the at least one catalyst, to which a predefinable lambda value can be applied, whereby the exhaust gas cleaning system advantageously includes at least one main catalyst, whose temperature is to be controlled by the method, and at least two pre-catalysts located upstream, wherein each pre-catalyst is arranged in its own exhaust gas path.

The introduction of the chemical energy is advantageously controlled by limiting the split factor, which is herein defined as a measure for the enrichment in one of the exhaust gas paths. A split factor of 25% at a desired mixed lambda of 1.0 indicates that in a four-cylinder engine two cylinders are operated with lambda=0.35 and two cylinders with lambda=1.5. When heating of the catalyst is requested, a request for introducing energy in the exhaust gas cleaning system is defined as a function of the actual catalyst temperature or as the difference between the actual catalytic temperature and a predefinable target temperature. Rapid heat-up of the catalyst to the target temperature is typically desirable, which requires the introduction of a large amount of energy into the exhaust gas system and hence also a high initial split factor. Compared to the mostly thermal conventional heating methods, a high chemical contribution to the heating process can increase the risk of overloading the catalyst, so that limiting the introduction of energy according to the invention for controlling the temperature of the catalyst is particularly advantageous.

According to the invention, the introduction of chemical energy or the split factor is limited according to the invention depending on the afore-mentioned parameters if:

the measured or modeled catalyst temperature increases independent of the difference to the target temperature, so as to prevent damage to the catalyst, in particular when the target temperature is near a minimum temperature that cannot be exceed before causing irreversible thermal damage, large positive temperature gradients exist in the main catalyst, in particular when the temperature in the main catalyst is high. This can take into consideration a potentially inhomogeneous temperature profile in the main catalyst, whereby the limitations must become stricter, if the positive temperature gradient ($d^2T/dt^2$) also progressively increases, which could indicate a potential "runaway" situation in the catalyst, and the exhaust gas mass flow decreases, which diminishes the cooling effect of the exhaust gas mass flow, which is cooler than the catalyst temperature. The limitations should become stricter at high negative exhaust gas mass flow gradients, for example when shifting gears, when transitioning to low load conditions or during overrun under firing conditions, because the HC and $O_2$ contents in the exhaust gas briefly strongly increase at any rate under these operating conditions.

The chemical energy fraction of the exhaust gas that can be converted in the catalyst is determined by the available mass flow of the reducing agents and oxygen. Therefore, when regulating to a desired lambda value before the catalyst, the lambda value in the lean path is preferably controlled to the lean lambda value resulting from the required split factor, depending on the measured lambda value before and after the main catalyst, whereas the rich path is pre-controlled. This approach can prevent problems in the control process controlled by a sensor typically arranged after the catalyst due to measurement errors in the lambda sensor located in the rich path downstream of the pre-catalyst, for example due to cross-sensitivity for hydrogen.

When the lean path is set to very lean, i.e., to a lambda value >1.4, preferably to the lambda value >1.55, the combustion process can reach its stable limit and increasingly cause misfiring. Therefore, according to one embodiment of the method of the invention, when the lean path has an extremely lean lambda value, the entire mixture can be either at least temporarily enriched, if the rich path is not suitably pre-controlled, or the rich path can be pre-controlled toward a "lean" setting by accepting a smaller split factor and lesser quantity of introduced energy. Preferably, this occurs when the lambda value in the lean path has values of >1.3, preferably >1.45.

The method of the invention is used preferably with $NO_x$ storage catalyst with optional pre-catalysts which are arranged upstream for desulfurization.

Advantageously, the method of the invention reduces the load of the catalytic system compared to conventional methods known in the art, while placing fewer restrictions on the lambda split.

The lean-runnable multicylinder engine according to the invention with an exhaust gas cleaning system capable of lambda-spitting, with at least one catalyst arranged in the exhaust gas cleaning system, includes according to the invention means for controlling the temperature of the at least one catalyst, wherein the means enable application of exhaust-gas-relevant measures for controlling the temperature of the at least one catalyst by influencing at least one operating parameter, preferably the lambda value of the multicylinder engine, depending on at least one of the parameters catalyst temperature, exhaust gas temperature and exhaust gas mass flow rate and/or depending on at least one of the parameters change of the catalyst temperature, change of the exhaust gas temperature and change of the exhaust gas mass flow rate ($1^{st}$ derivative), and/or depending on at least one of the parameters rate of change of the catalyst temperature, rate of change of the exhaust gas temperature and rate of change of the exhaust gas mass flow rate ($2^{nd}$ derivative). Advantageously, the lambda-splittable exhaust gas cleaning system of the multicylinder engine is designed so that at least two exhaust gas paths, to which a predefinable lambda value can be applied, are disposed between the multi-cylinder engine and the at least one catalyst. According to a particularly advantageous embodiment, the exhaust gas cleaning system has at least one main catalyst with at least two upstream pre-catalysts, wherein each pre-catalyst is arranged in a dedicated exhaust gas path, and wherein a predefinable lambda value can be applied to each exhaust gas path.

The means also include a control device, which is preferably integrated in a motor controller, wherein models and algorithms for a coordinated control of exhaust-gas-related and performance-related measures can be stored in digitized form.

The multicylinder engine according to the invention is a gasoline engine, in particular a direct-injection gasoline engine, or a diesel engine.

Advantageously, the exhaust gas cleaning system, or the at least one catalyst of the exhaust gas cleaning system of the multicylinder engine according to the invention, have a reduced precious metal contents. In particular, with pre-catalysts, the precious metal contents can be reduced significantly compared to conventional systems.

Conventional vehicles with direct-injection, stratified charge gasoline engines, which according to the Neuen Europäischen Fahrzyklus NEFZ (New European Driving Cycle) achieve a HC emission of <0.07 g/km and a $NO_x$ emission of <0.05 g/km with a thermally undamaged catalytic system comprised of one or more pre-catalysts disposed near the engine and one or more downstream $NO_x$ storage catalysts with a stored sulfur mass <0.2 g/l of the catalyst volume, and operating with a stratified charge for at least 250 seconds, preferably for at least 350 seconds, employ catalysts with a precious metal contents of $\geqq 4.67$ g/dm³ (130 g/ft³).

Advantageously, in the multicylinder engine according to the invention, the precious metal content of at least the pre-catalyst(s) can be reduced to $\leqq 3.59$ g/dm³ (100 g/ft³), and preferably to $\leqq 2.87$ g/dm³ (80 g/ft³). With the afore-described method, the HC emission in the same vehicle does not exceed 0.1 g/km and the $NO_x$ emission does not exceed 0.08 g/km according to NEFZ, even after furnace anneal of the pre-catalyst(s) with the reduced precious metal contents for 4 hours at 1100° C. in an atmosphere containing 2% $O_2$ and 10% $H_2$, and of the $NO_x$ storage catalyst(s) for 4 hours at 850° C. in an atmosphere containing 2% $O_2$ and 10% $H_2$.

BRIEF DESCRIPTION OF THE DRAWINGS

Embodiments of the invention will be described hereinafter in more detail with reference to the appended drawings. It is shown in.

DETAILED DESCRIPTION OF THE INVENTION

Figure 1:
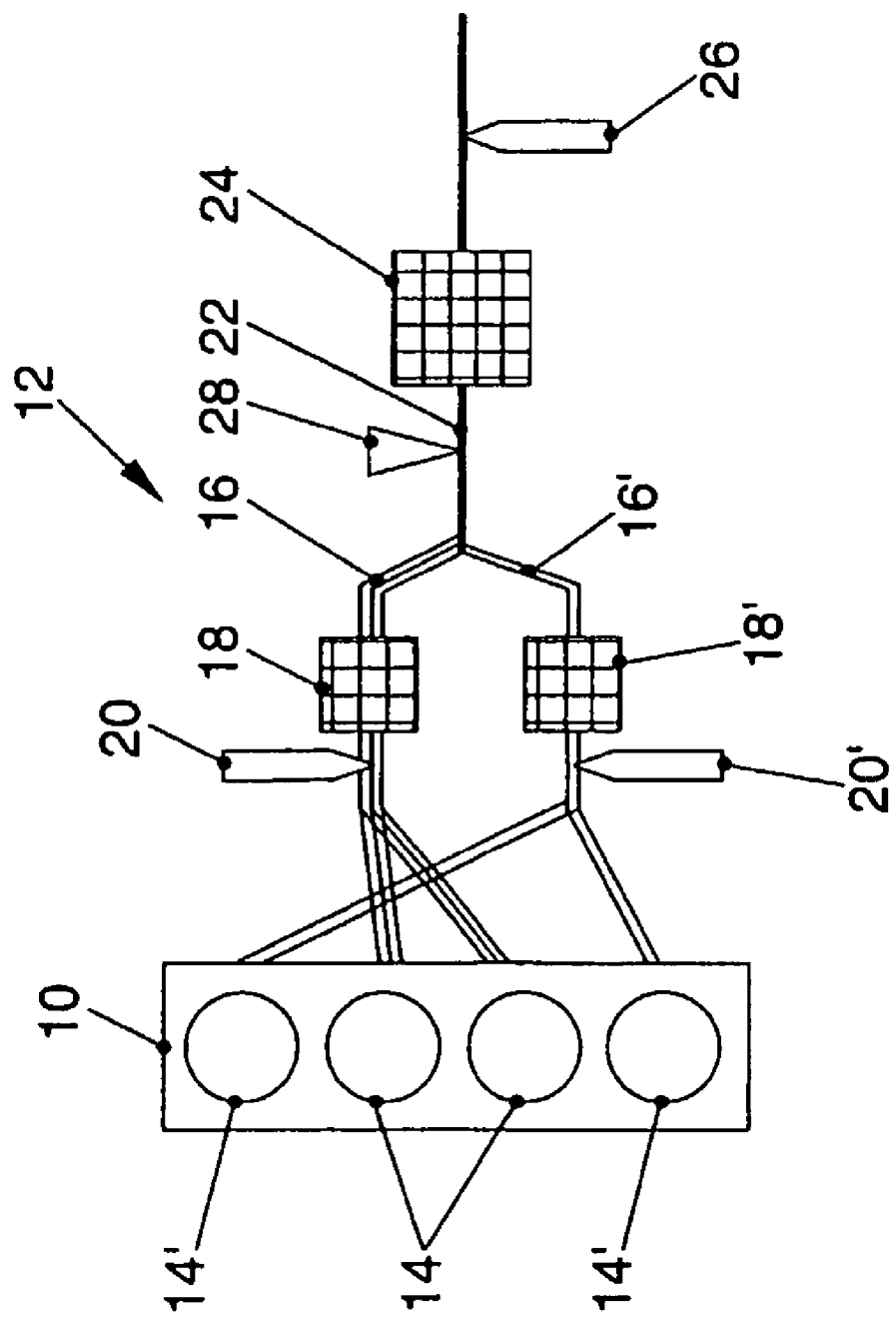
FIG. 1 a schematic diagram of a combustion engine installation according to the invention, and FIG. 2 a schematic process flow diagram of the method of the invention.

FIG. 1 shows a multicylinder engine 10 and a double-flow exhaust gas cleaning system 12 arranged downstream of the multicylinder engine 10. Each of a pair of cylinders 14, 14' of the multicylinder engine 10 is associated with a corresponding one of the two exhaust gas paths 16, 16' of the exhaust gas cleaning system 12. Each exhaust gas path 16, 16' includes a pre-catalyst 18, 18' with an upstream lambda sensor 20, 20'. The two exhaust gas paths 16, 16' are combined downstream of the pre-catalysts 18, 18' into a single exhaust gas path 22, in which a main catalyst 24 is arranged. A lambda measurement device 26 which can be formed by a lambda sensor or by a $NO_x$ sensor is arranged downstream of the main catalyst 24. A temperature sensor 28 for determining the exhaust gas temperature or the catalyst temperature, respectively, is arranged upstream of the main catalyst 24. Rich exhaust gas flows through one exhaust gas path 16, whereas lean exhaust gas flows through the second exhaust gas path 16'. The lambda values of the two exhaust gas paths are preferably split so that a lambda value of approximately 1 is attained after the two exhaust gas paths are combined into a single exhaust gas path 22, which terminates in the main catalyst 24. The signals provided by the lambda sensors 20, 20', by the lambda measurement device 26, and by the temperature sensor 28 are processed in a control device or in an engine controller (not shown).

Figure 2:
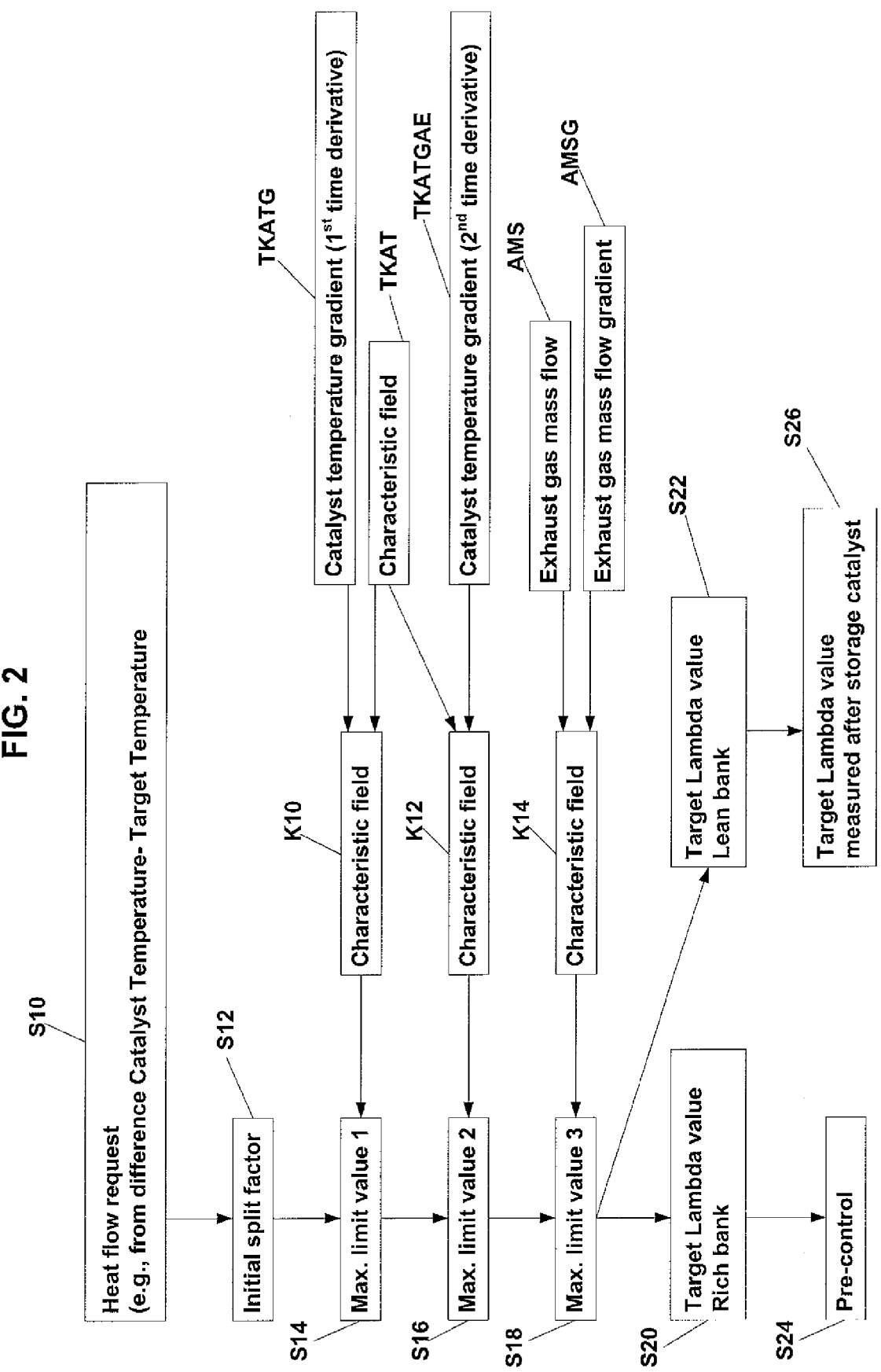

FIG. 2 shows a flow diagram of the process according to the invention. Initially, a heat flow is requested, S10, according to, for example, the difference between the catalyst temperature TKAT and the desired temperature or target temperature of the main catalyst 24. An initial split factor S12 is then defined, which is subject to limiting factors S14, S16, and S18. The first limiting factor S14 is defined by an engine operating field K10 based on the catalyst temperature TKAT and the catalyst temperature gradient TKATG. Accordingly, the introduction of energy is limited with increasing catalyst temperature TKAT, without having to take into consideration the difference between the catalyst temperature TKAT and the target temperature. The catalyst temperature TKAT, together with the change in the gradient of the catalyst temperature TKATGAE, is also used for a second engine operating field K12 of the second limiting factor S16, which takes into consideration an inhomogeneous temperature distribution in the main catalyst 24. The split factor is limited for large positive temperature gradients in the main catalyst 24, in particular if the temperatures TKAT in the main catalyst 24 are already high. If the positive temperature gradient TKATG also progressively increases, then the split factor is further reduced to safely eliminate the risk of a "runaway" situation in the main catalyst 24. The third limiting factor S18 uses a third engine operating field K14 to limit the split factor depending on the exhaust gas mass flow AMS and the exhaust gas mass flow gradient AMSG. This may be necessary because a reduced exhaust gas mass flow rate provides less cooling, and because under operating conditions, which require a high negative exhaust gas mass flow gradient, the HC and $O_2$ contents in the exhaust gas and the introduced chemical energy show at least temporarily a strong increase. The desired lambda value S20 in the exhaust gas path 16 with the rich exhaust gas and the desired lambda value S22 in the exhaust gas path 16' with the lean exhaust gas are then preset, wherein the desired lambda value for the exhaust gas path 16 with the rich exhaust gas is pre-controlled in a step S24 and the desired lambda value for the exhaust gas path 16' with the lean exhaust gas is controlled in a step S26 by the lambda value measured after the main catalyst 24.

LIST OF A REFERENCE CHARACTERS 10 multicylinder engine
12 exhaust gas cleaning system
14, 14' cylinder
16, 16' exhaust gas path
18, 18' pre-catalyst
20, 20' lambda sensor
22 exhaust gas path
24 main catalyst
26 lambda measurement device
28 temperature sensor
S10 heat flow request
S12 definition of an initial split factor
S14 first limiting factor
S16 second limiting factor
S18 third limiting factor
S20 definition of the desired lambda value for the rich exhaust gas path
S22 definition of the desired lambda value for the lean exhaust gas path
S24 pre-controller
S26 controller
K10 first engine operating field
K12 second engine operating field
K14 third engine operating field
TKAT catalyst temperature
TKATG catalyst temperature gradient
TKATGAE change in the catalyst temperature gradient
AMS exhaust gas mass flow
AMSG exhaust gas mass flow gradient

The invention claimed is:

1. Method for controlling the temperature of at least one catalyst arranged in an exhaust gas cleaning system (12) of a lean-runnable multi-cylinder engine (10), wherein energy is introduced into the exhaust gas cleaning system (12) by a lambda split, and the introduction of energy is limited depending on:

(a) at least one of catalyst temperature, exhaust gas temperature, exhaust gas mass flow rate, change of the catalyst temperature with respect to time, change of the exhaust gas temperature with respect to time and change of the exhaust gas mass flow rate with respect to time; and (b) at least one of rate of change of the catalyst temperature with respect to time, rate of change of the exhaust gas temperature with respect to time and rate of change of the exhaust gas mass flow rate with respect to time.

2. Method according to claim 1, characterized in that the exhaust gas cleaning system (12) includes at least two exhaust gas paths (16, 16') disposed between the multi-cylinder engine (10) and the at least one catalyst, wherein a predefinable lambda value can be applied to each of the at least two exhaust gas paths.

3. Method according to claim 1, characterized in that the exhaust gas cleaning system (12) has at least one main catalyst (24) with at least two upstream pre-catalysts (18, 18'), wherein each pre-catalyst (18, 18') is arranged in a corresponding exhaust gas path (16, 16') to which a pre-definable lambda value can be applied.

4. Method according to claim 1, characterized in that the introduction of energy is limited when the exhaust gas mass flow decreases.

5. Method according to claim 1, characterized in that the introduction of energy is limited depending on the catalyst temperature, the time-dependent change of the catalyst temperature and the rate of change of the catalyst temperature and of the exhaust gas mass flow.

6. Method according to claim 1, characterized in that the introduction of energy is limited with increasing, measured or modeled temperature of the at least one catalyst.

7. Method according to claim 6, wherein the at least one catalyst is the main catalyst.

8. Method according to claim 1, characterized in that the introduction of energy in at least one catalyst is limited for a high positive time-dependent temperature gradient.

9. Method according to claim 8, wherein the at least one catalyst is the main catalyst.

10. Method according to claim 1, characterized in that the introduction of energy in at least one catalyst is limited when a positive time-dependent temperature gradient progressively increases.

11. Method according to claim 10, wherein the at least one catalyst is the main catalyst.

12. Method according to claim 1, characterized in that the at least one catalyst is a $NO_x$-storage catalyst, whose temperature is controlled by introduction of energy into the exhaust gas cleaning system so that the $NO_x$-storage catalyst is desulfurized.

13. Method according to claim 12, wherein the at least one catalyst is the main catalyst.

14. Method according to claim 1, characterized in that the amount of the introduced energy is defined by a split factor, which is determined when introduction of energy is requested, with the split factor defining the lambda values of the individual exhaust gas paths (16, 16') in the exhaust gas cleaning device (12).

15. Method according to claim 14, characterized in that with a very lean setting on the lean exhaust gas path (16'), either an at least temporary enrichment of the entire mixture is permitted, if the pre-control of the rich exhaust gas path (16) is not modified accordingly, or the rich exhaust gas path (16) is pre-controlled to lean lambda values, wherein at least one of the split factor is reduced and less energy is introduced.

16. Method according to claim 14, characterized in that with a lambda value <1.3 in the lean exhaust gas path (16'), either at least a temporary enrichment of the entire mixture is permitted, if the pre-control of the rich exhaust gas path (16) is not modified accordingly, or the rich exhaust gas path (16) is pre-controlled to lean lambda values, wherein at least one of the split factor is reduced and less energy is introduced.

17. Method according to claim 14, characterized in that with a lambda value $\geq 1.45$ in the lean exhaust gas path (16'), either an at least temporary enrichment of the entire mixture is permitted, if the pre-control of the rich exhaust gas path (16) is not modified accordingly, or the rich exhaust gas path (16)is pre-controlled to lean lambda values, wherein at least one of the split factor is reduced and less energy is introduced.

18. Method according to claim 14, characterized in that when the lambda value before the at least one catalyst is controlled to a desired value, the lambda value in the lean exhaust gas path (16') is controlled to the lean lambda value, which results from the required split factor, depending on the lambda value measured before and after the at least one catalyst, in particular the main catalyst (24), whereas the rich exhaust gas path (16') is pre-controlled.

19. Method according to claim 18, wherein the at least one catalyst is the main catalyst.

20. Lean-runnable multicylinder engine (10) with an exhaust gas cleaning system (12) capable of lambda-splitting, with at least one catalyst arranged in the exhaust gas cleaning system (12), wherein the multicylinder engine (10) includes means for controlling the temperature of the at least one catalyst, wherein the means introduces energy into the exhaust gas cleaning system (12) by way of a lambda split and wherein the introduction of energy is limited depending on:

(a) at least one of catalyst temperature, exhaust gas temperature, exhaust gas mass flow rate, change of the catalyst temperature with respect to time, change of the exhaust gas temperature with respect to time and change of the exhaust gas mass flow rate with respect to time; and (b) at least one of rate of change of the catalyst temperature with respect to time, rate of change of the exhaust gas temperature with respect to time and rate of change of the exhaust gas mass flow rate with respect to time.

21. Multicylinder engine according to claim 20, characterized in that the exhaust gas cleaning system (12) includes at least two exhaust gas paths (16, 16') disposed between the multi-cylinder engine (10) and the at least one catalyst, wherein a predefinable lambda value can be applied to each of the at least two exhaust gas paths.

22. Multicylinder engine according to claim 20, characterized in that at least one of the at least one catalyst and the main catalyst (24) is a $NO_x$-storage catalyst.

23. Multicylinder engine according to claim 20, characterized in that the means comprise a control device, in which models and algorithms for a coordinated control of exhaust-gas-related and performance-related measures are stored in digitized form.

24. Multicylinder engine according to claim 20, characterized in that the multicylinder engine (10) is a gasoline engine or a diesel engine.

25. Multicylinder engine according to claim 24, wherein the gasoline engine is a direct-injection gasoline engine.

26. Multicylinder engine according to claim 20, characterized in that the exhaust gas cleaning system (12) has at least one main catalyst (24) with at least two upstream pre-catalysts (18, 18'), wherein each pre-catalyst (18, 18') is arranged in a corresponding exhaust gas path (16, 16'), to which a predefinable lambda value can be applied.

27. Multicylinder engine according to claim 26, characterized in that the precious metal content of the at least two pre-catalysts (18, 18') is $\leq 3.59$ g/dm$^3$.

28. Multicylinder engine according to claim 27, wherein the precious metal content of the at least two pre-catalysts (18, 18') is $\leq 2.87$ g/dm$^3$.

* * * * *